US010132482B1

(12) United States Patent
Redpath et al.

(10) Patent No.: US 10,132,482 B1
(45) Date of Patent: Nov. 20, 2018

(54) ERGONOMIC TORCH APPARATUS

(71) Applicants: Richard Redpath, Cary, NC (US); James Redpath, Cary, NC (US); Parhelion Incorporated, Wilmington, DE (US)

(72) Inventors: Richard Redpath, Cary, NC (US); James Redpath, Cary, NC (US)

(73) Assignees: Richard Redpath, Cary, NC (US); James Redpath, Cary, NC (US)

( * ) Notice: Subject to any disclaimer, the term of this patent is extended or adjusted under 35 U.S.C. 154(b) by 0 days.

(21) Appl. No.: 15/860,149

(22) Filed: Jan. 2, 2018

Related U.S. Application Data

(60) Provisional application No. 62/508,021, filed on May 18, 2017.

(51) Int. Cl.

| | |
|---|---|
| ***F21V 23/04*** | (2006.01) |
| ***F21V 3/00*** | (2015.01) |
| ***H02J 7/02*** | (2016.01) |
| ***F21L 4/08*** | (2006.01) |
| ***F21L 4/02*** | (2006.01) |
| *F21Y 115/10* | (2016.01) |

(52) U.S. Cl.
CPC .............. *F21V 23/04* (2013.01); *F21L 4/025* (2013.01); *F21L 4/08* (2013.01); *F21V 3/00* (2013.01); *H02J 7/025* (2013.01); *F21Y 2115/10* (2016.08)

(58) Field of Classification Search
CPC ... F21L 4/025; F21L 4/08; F21L 4/085; F21Y 2113/20; F21Y 2115/10; F21Y 2115/30
See application file for complete search history.

(56) References Cited

U.S. PATENT DOCUMENTS

| | | | | |
|---|---|---|---|---|
| 4,782,432 A * | 11/1988 | Coffman | F21L 4/025 | 136/291 |
| 6,022,127 A * | 2/2000 | Krietzman | F21L 4/025 | 362/183 |
| 6,196,702 B1 * | 3/2001 | Krietzman | F21V 31/00 | 362/110 |
| 6,623,139 B1 * | 9/2003 | Gutmann | F21L 4/025 | 362/184 |
| 2008/0134562 A1 * | 6/2008 | Teetzel | F41G 1/35 | 42/146 |
| 2009/0116231 A1 * | 5/2009 | Miller | F21L 4/027 | 362/208 |

(Continued)

*Primary Examiner* — Alexander Garlen
(74) *Attorney, Agent, or Firm* — Ming Chow; Sinorica, LLC

(57) ABSTRACT

A rescue torch apparatus utilizes coherent and incoherent light sources to help firefighters navigate through smoke and fire filled environments. The rescue torch apparatus includes a coherent-light emitter, an incoherent-light emitter, an elongated body, a rotatable-activation mechanism, a portable power unit, and an inductive receiver. The incoherent-light emitter emits continuous light for general illumination or short bursts of light to activate photo-luminescent display panels worn by firefighters. The coherent-light emitter emits beams of coherent light that penetrate through smoke filled environments and outline obstacles. The elongated body houses and protects the coherent-light emitter and the incoherent-light emitter. The rotatable-activation mechanism allows for hands-free operation of the light sources. Power is provided by a portable power unit mated to an inductive receiver for wireless recharging.

9 Claims, 9 Drawing Sheets

(56) References Cited

U.S. PATENT DOCUMENTS

| | | | | |
|---|---|---|---|---|
| 2010/0231142 | A1* | 9/2010 | Yoon | F21L 4/027<br>315/312 |
| 2012/0176780 | A1* | 7/2012 | Gross | F21L 4/027<br>362/184 |
| 2012/0188768 | A1* | 7/2012 | Redpath | G02B 5/1842<br>362/259 |
| 2012/0268920 | A1* | 10/2012 | Matthews | F21V 23/0414<br>362/110 |
| 2014/0268703 | A1* | 9/2014 | Ehlert | F21L 4/027<br>362/184 |
| 2016/0018071 | A1* | 1/2016 | Sharrah | F21L 4/025<br>362/184 |
| 2017/0307148 | A1* | 10/2017 | Sharrah | F21L 4/025 |

* cited by examiner

ERGONOMIC TORCH APPARATUS

The current application claims a priority to the U.S. Provisional Patent application Ser. No. 62/508,021 filed on May 18, 2017.

FIELD OF THE INVENTION

The present invention generally relates to a rescue torch apparatus to accommodate protective clothing and emergency equipment. More specifically, the rescue torch apparatus includes a coherent-light emitter and an incoherent-light emitter controlled by a rotatable-activation mechanism, which allow for hands-free or single-handed operation.

BACKGROUND OF THE INVENTION

Although there are numerous portable light and light source modules for illumination, e.g. flashlights, the devices do not provide a utility and additional functionality for a hazardous turbid environment such as smoke and fire to aid in navigation, coordination, and the search and rescue with the encumbering protective clothing and equipment required in such environment.

Flashlights are available in simple elongated cylindrical barrel shape with a light source at one end to project light in a longitudinal axis or more complex configurations with a pivotable head to direct light at various directions. Added features include control of brightness and power usage through dimming, flashing, and incorporate various types of clips to hang on pocket, belt, or wall. All focus on use of a single white light source type from either incandescent, halogen, xenon, or modern lights of emitting diode (LED) using reflector/lens combination to shape the light in a longitudinal axis for purpose of general illumination.

Flashlights intended for fire and rescue are carried on rigid protective clothing along with emergency equipment and can usually be operated with thick gloves. Prior art rescuer flashlights, referred to as torches, provide an enlarged top multi-function button for light control but in the field fireman have realized they need to use two hands one to hold the torch against clothing as not to unclip or be pushed through the securing jacket loop and the other hand to push the top button. The rigid protective clothing encumbers the rescuer's dexterity for ease of operation and the button press-down usage prevents both hands being freed. Typically, a hanging clip is provided to attach to clothing, but not adaptable to all clothing configurations nor fully secure, and integrated hanger occasionally catches on the clothing for quick removal or attachment. Such torches provide a white light for general illumination which has been adapted by fireman to energize personal glow-in-the-dark equipment displays requiring photoluminescence. Furthermore, these torches typically provide a specialized charging station that connects to external leads on the body of the torch. The charging torch leads in water situations can potentially short circuit the battery and dissipate charge or become covered by dust or soot rendering them useless unless cleaned. An alternative solution to this charging paradigm of external leads is a protective circuit and/or ejecting a separate battery pack from within the torch body that requires a specialized charging station.

Although portable lights do provide illumination in hazardous locations, the source of light is of single variant that cannot adequately penetrate smoke and fire areas without the blinding reflection traditional light sources as well as providing a distinguished source of lighting. Further, all these devices to accommodate the adornment of heavy gloves use provide an enlarged button actuator for light operation which typically requires the use of two hands. Further, the protruding electrical leads for charging present a potential hazard that can be avoided through circuit design but still required the need for cleaning and limit the flexibility of charger installation in tight areas.

In light of these issues, it is the objective of the present invention to provide a rescue torch apparatus for accommodating protective clothing worn by firefighters. Yet another objective of the present invention is to provide a lighting source capable of penetrating and contrasting the smoke and fire environments. It is yet another objective of the present invention to provide ergonomic activation mechanisms designed to accommodate the gloves worn by firefighters. The activation mechanisms are designed to allow for hands-free to single-handed operation of the present invention. Further, this eliminates protruding electrical leads for charging that present a potential hazard and/or require cleaning and limit the flexibility of charger installation in tight areas.

SUMMARY OF THE INVENTION

The present invention addresses these issues through utility, operation, and employment of selectable dual light sources suited for a hazardous turbid environment such as smoke and fire. The present invention provides a blue or green laser light source using a diffraction optical element void of lens or reflector to penetrate and contrast with smoke and fire. The laser light provides piercing line striping to identify obstacles, holes, or exits for hints to navigation and dimensions as well as scan the area of rescuers wearing reflective clothing to coordinate or provide deep reaching signaling as a flashing beacon. An LED light source is provided for general illumination and provides short burst of light for energizing personal glow-in-the-dark equipment that are photoluminescent (luminescence induced by the absorption of infrared radiation). Laser and LED light sources are controlled by an enlarged bezel in the shape of a cogwheel on the face of the body to rotate for simply push to control selection and operation of lights sources. Instead of using a traditional button with finger to turn on/off light source, the bezel is rotated by single hand, finger, wrist, palm, or arm push. Further, the present invention uses wireless charging to eliminate the use of external leads, which obviates the need for cleaning of leads, no potential for discharge, and provides flexible installation of charger in tight areas.

DETAILED DESCRIPTION OF THE INVENTION

All illustrations of the drawings are for the purpose of describing selected versions of the present invention and are not intended to limit the scope of the present invention.

Figure 1:
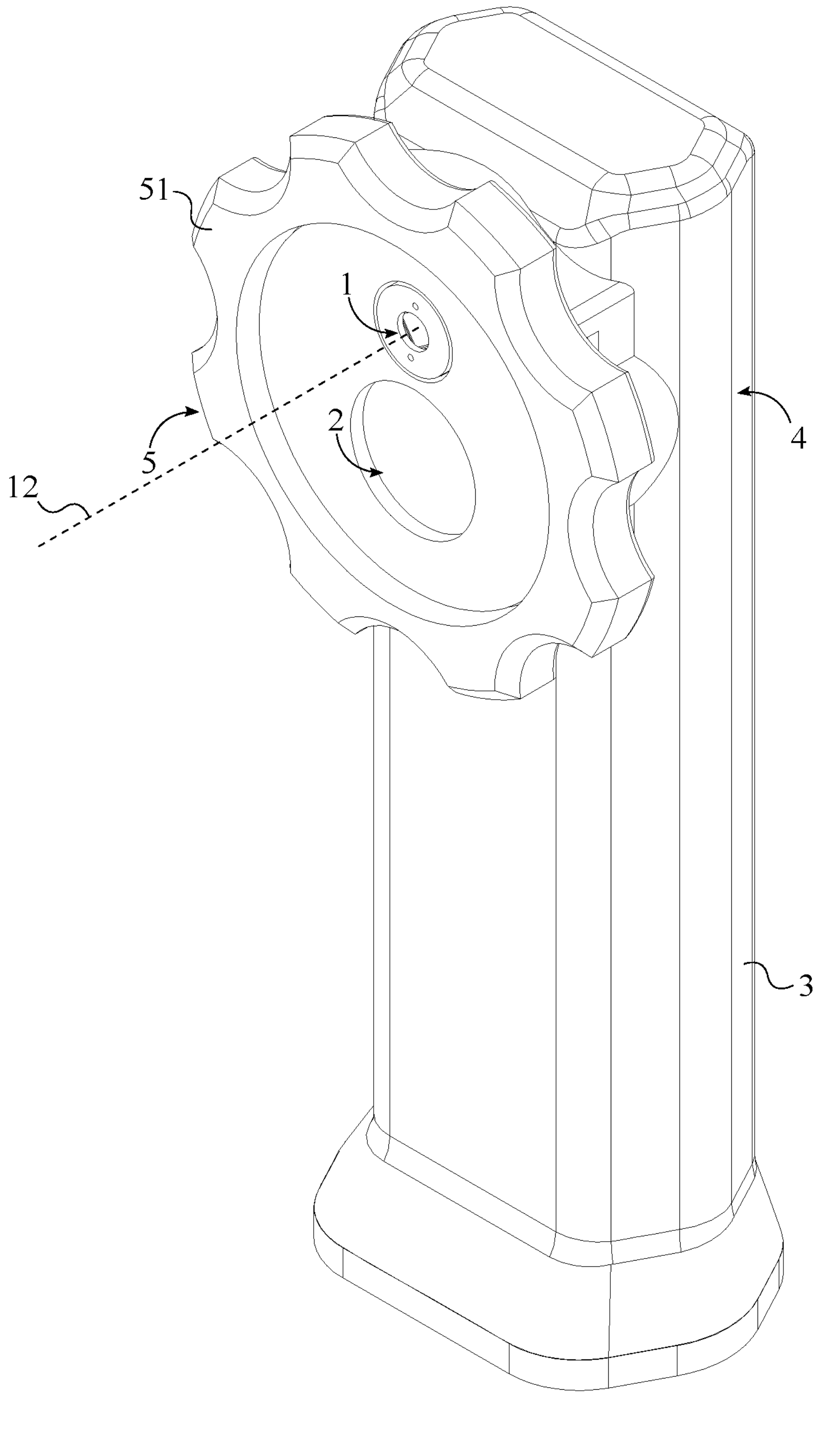
FIG. 1 is a front perspective view of the present invention.
Figure 2:
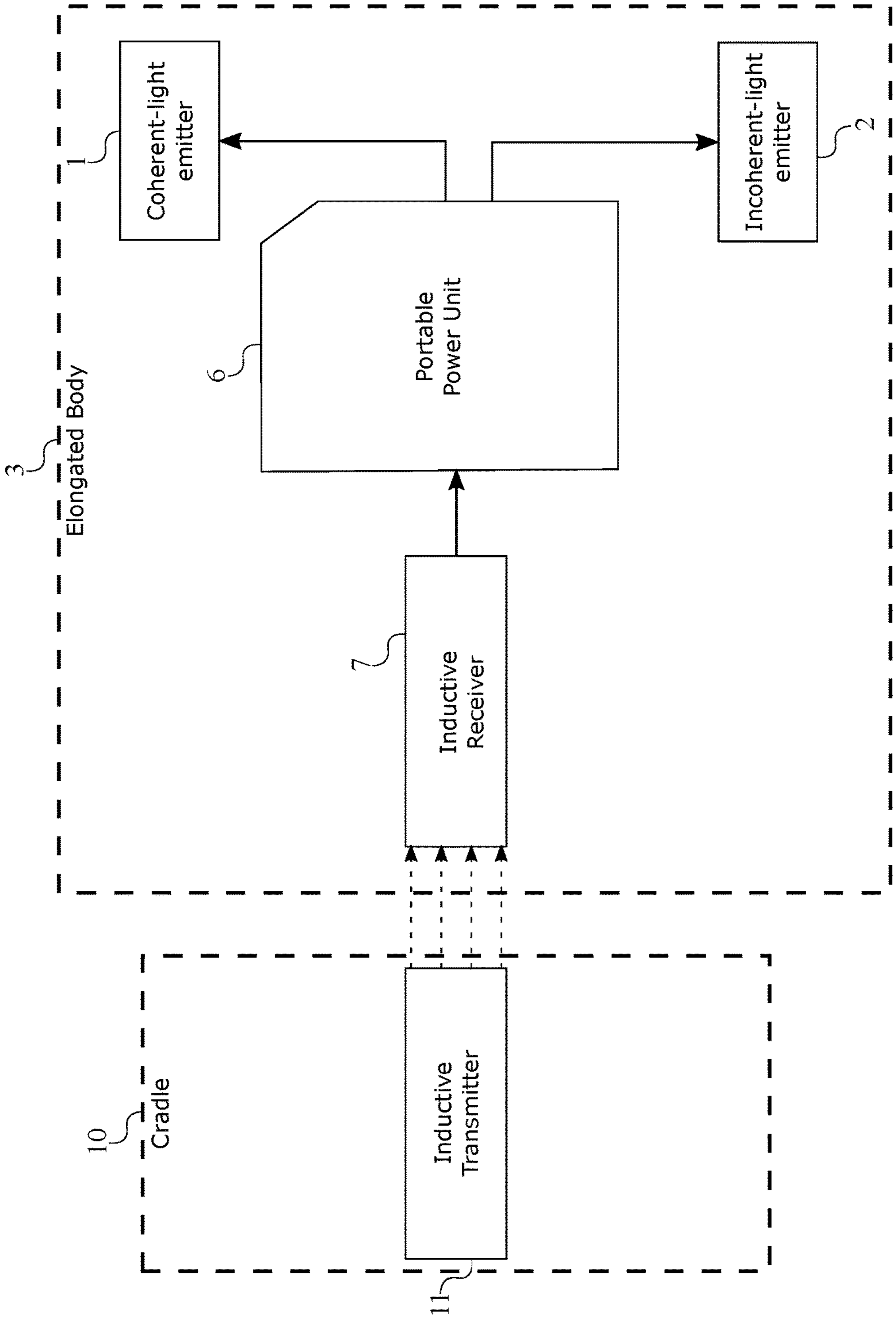
FIG. 2 is a schematic diagram showing the electrical connections between the portable power unit and the selected electrically operated components.

The present invention is a rescue torch utilizing a coherent-light emitter 1 and an incoherent-light emitter 2 activated by hands-free or single-handed activation mechanisms. FIG. 1 and FIG. 2 shows the preferred embodiment of the present invention comprising a coherent-light emitter 1, an incoherent-light emitter 2, an elongated body 3, a rotatable-activation mechanism 5, a portable power unit 6, and an inductive receiver 7. The coherent-light emitter 1 emits stripes of coherent light beams capable of penetrating and contrasting with smoke and fire. The incoherent-light emitter 2, placed next to the coherent-light emitter 1, emits continuous incoherent light for general illumination and short bursts of light to energize personal glow-in-the-dark photo-luminescent display equipment worn by firefighters. Both the coherent-light emitter 1 and the incoherent-light emitter 2 are mounted onto to an elongated body 3 dimensioned to fit easily into the hand of a firefighter wearing gloves. More specifically, the preferred elongated body 3 has a planar shape designed to fit into the palm of the firefighter. The rotatable-activation mechanism 5 allows for the operation of the incoherent-light emitter 2 or coherent-light emitter 1 by a single hand, finger, wrist, palm, or arm of either the right hand or left hand. The portable power unit 6 and the inductive receiver 7 enable wireless charging between an inductive charging terminal and the present invention. This obviates the need for protruding electric leads found in conventional rescue lighting devices that can become covered in dusk or soot thus rendering them useless unless cleaned. This also reduces the chance of short circuits when charging the present invention in damp environments. The elongated body 3 is designed to be held and operated comfortably in one hand. As such, the coherent-light emitter 1 and the incoherent-light emitter 2 are terminally integrated into the elongated body 3, leaving a large gripping area that the firefighter can grip. Further, the rotatable-activation mechanism 5 is externally mounted onto the elongated body 3. More specifically, the rotatable-activation mechanism 5 is positioned proximal to the firefighter's finger so that the firefighter can operate the rotatable-activation mechanism 5 without releasing the elongated body 3. Both the portable power unit 6 and the inductive receiver 7 are secured inside the elongated body 3. More specifically, the portable power unit 6 is mounted within the elongated body 3. The preferred portable power unit 6 is a rechargeable battery sealed inside the elongated body 3. Alternately, the portable power unit 6 may be releasably mounted into the elongated body 3.

Figure 3:
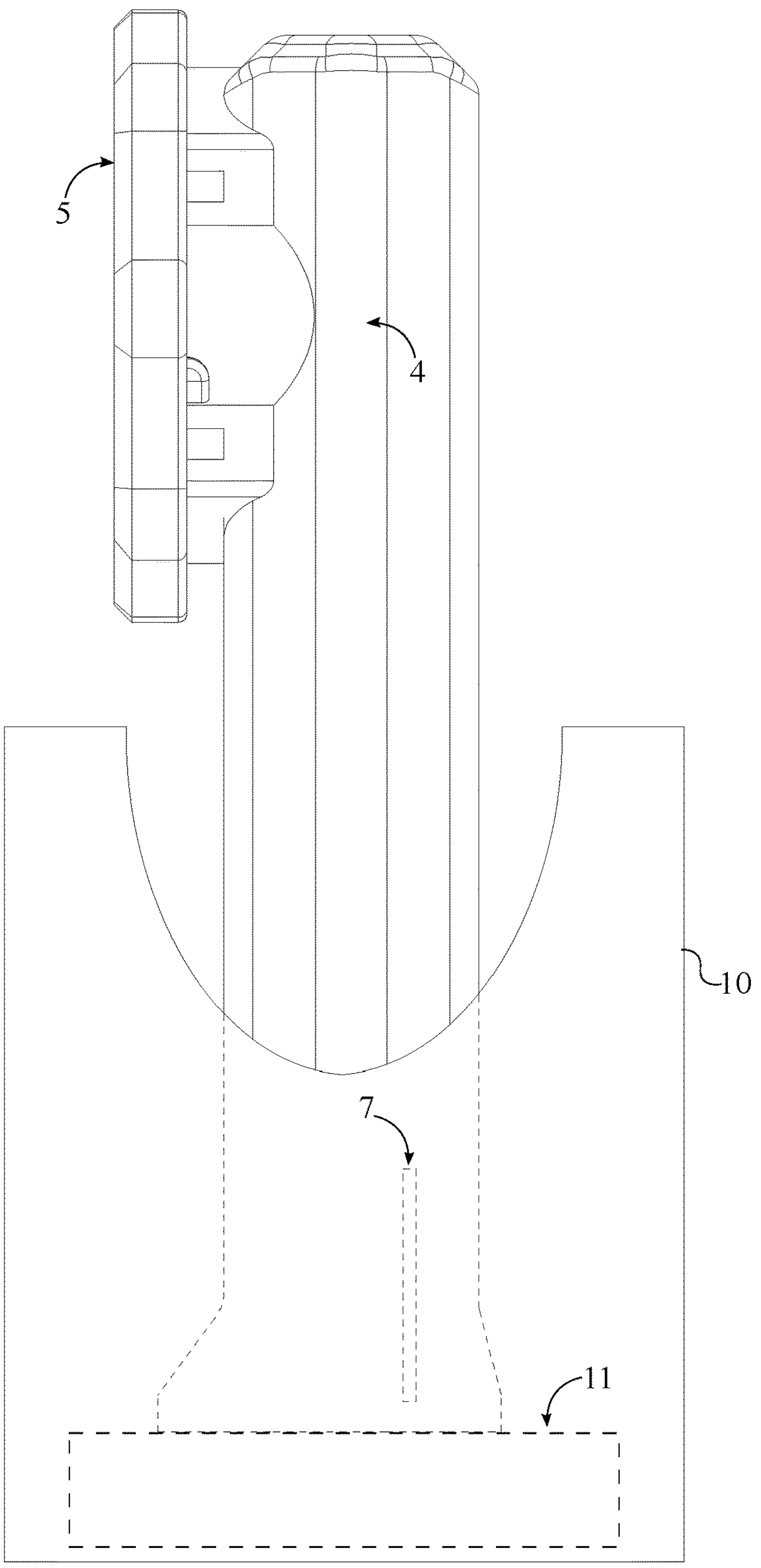
FIG. 3 is a side view of the present invention showing the elongated body positioned inside the cradle.

In reference to FIG. 2 and FIG. 3, the inductive receiver 7 is integrated into the elongated body 3. Preferably, the inductive receiver 7 may be a secondary coil capable of forming a resonant circuit with an external primary coil. The secondary coil may be integrated into a circuit board. The circuit board may comprise logical circuits that control the transmission of signals between the electrically operated components. Consequently, the portable power unit 6 is electrically connected to the coherent-light emitter 1 and the incoherent-light emitter 2 through the rotatable-activation mechanism 5. Thus, rotating the rotatable-activation mechanism generates a signal causing the logical circuit to activate the coherent-light emitter 1 or an incoherent-light emitter 2. The logical circuits may take input signals provided by the rotatable-activation mechanism 5 to operate the coherent-light emitter 1, the incoherent-light emitter 2, and various other output devices. The logical circuits may also control the transmission of electricity between the portable power unit 6 and the electrically operated components. Further, the inductive receiver 7 is electrically connected to the portable power unit 6. This allows the inductive receiver 7 to generate electrical energy from the wireless signals received from the primary coil.

Figure 4:
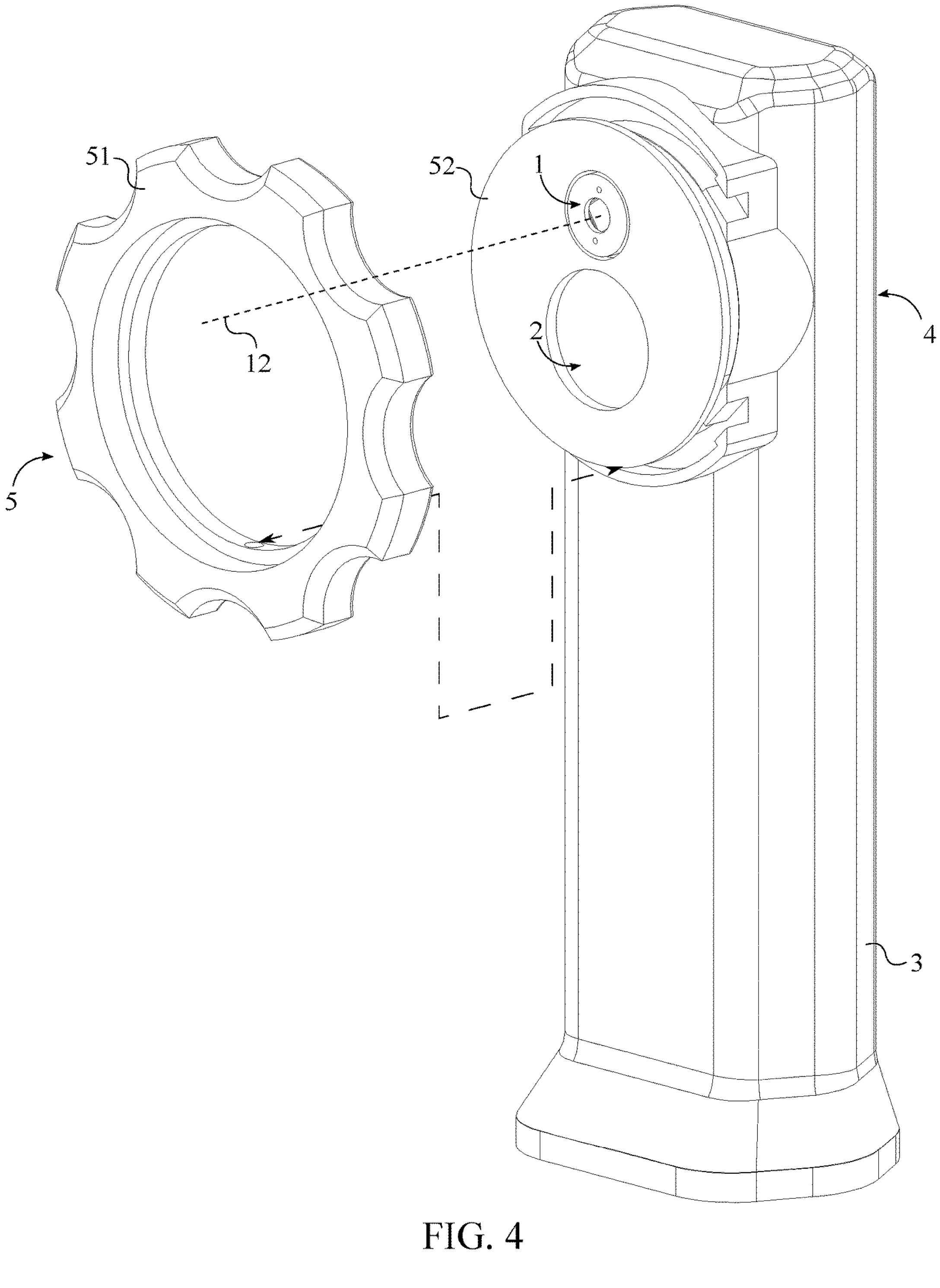
FIG. 4 is a perspective exploded view of the present invention with the cogwheel bezel detached from the rotary switch.
Figure 5:
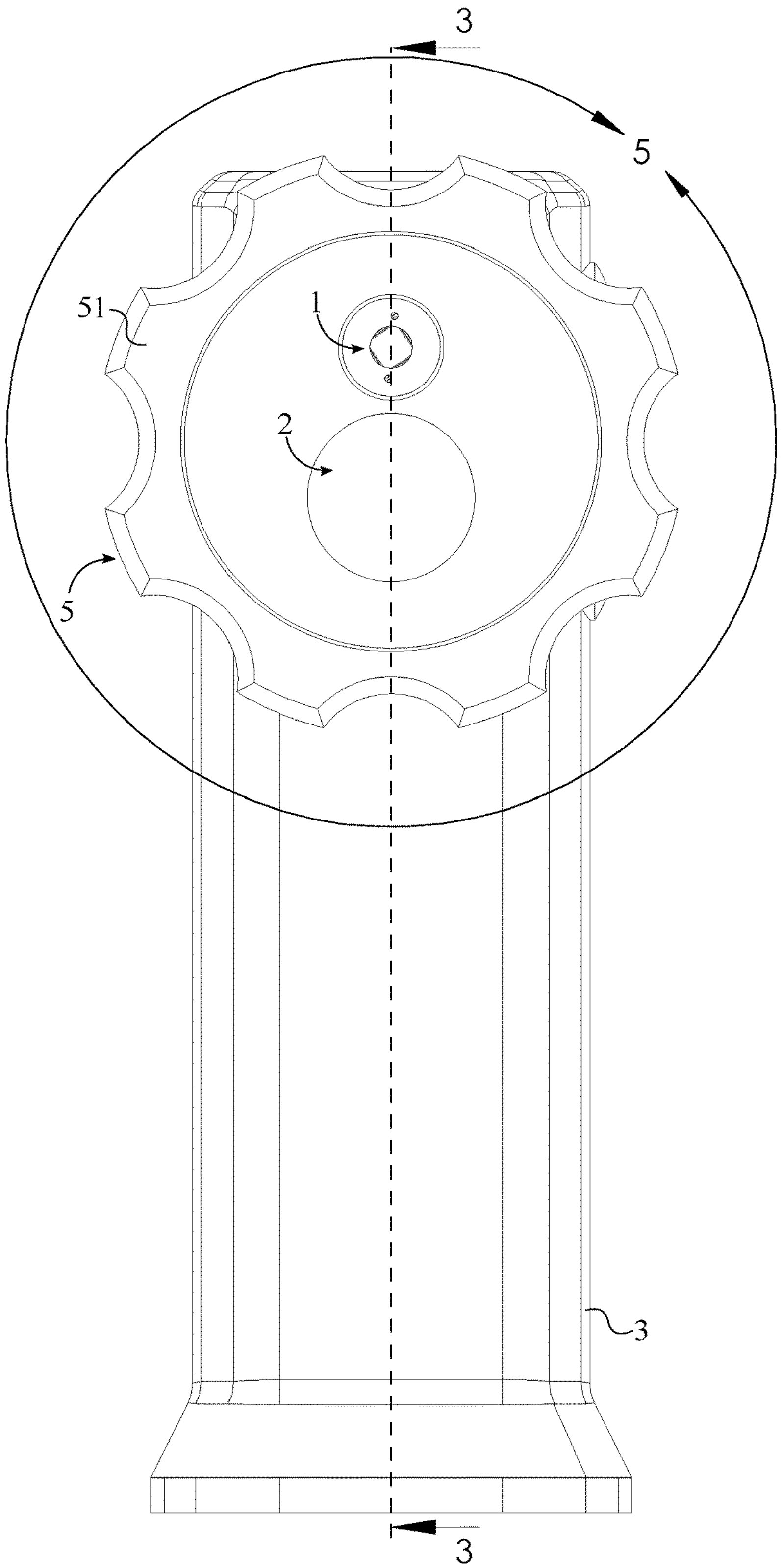
FIG. 5 is a front view of the present invention.

As can be seen in FIG. 4 and FIG. 5, the rotatable-activation mechanism 5 comprises a bezel cogwheel 51 and a rotary switch 52. The bezel cogwheel 51 accommodates the use of thick protective gloves, which make buttons difficult to operate, when actuating the rotary switch 52. The rotary switch 52 allows the firefighter to selectively actuate either the coherent-light emitter 1 and the incoherent-light emitter 2. The rotary switch 52 is integrated into the elongated body 3. More specifically, the preferred rotary switch 52 is mounted onto a metallic panel encircling the coherent-light emitter 1 and the incoherent-light emitter 2. The bezel cogwheel 51 is positioned concentric to the metallic panel and is rotatably attached onto the rotary switch 52. In the preferred embodiment of the present invention, the bezel cogwheel 51 comprises a rim and a plurality of protrusions. The rim contains one or more magnets that form a magnetic bond with the metallic panel. The plurality of protrusions is radially distributed around the rim and provides a single-handed or hands-free way of rotating the bezel cogwheel 51. To rotate the bezel cogwheel 51, the firefighter can simply nudge one of the protrusions with the left or right hand. Likewise, the plurality of protrusions can be pushed with a finger, wrist, palm, or arm of either the left or right arm. The magnetic bond between the rim and the metallic panel creates a torsional connection between the bezel cogwheel 51 and the rotary switch 52, allowing the actuation of the rotary switch 52. To achieve this, the portable power unit 6 is electrically connected to the coherent-light emitter 1 and the incoherent-light emitter 2 through the rotary switch 52. More specifically, the rotary switch 52 is configured to selectively complete an electrical circuit between the portable power unit 6 and the coherent-light emitter 1 or the incoherent-light emitter 2.

Figure 5A:
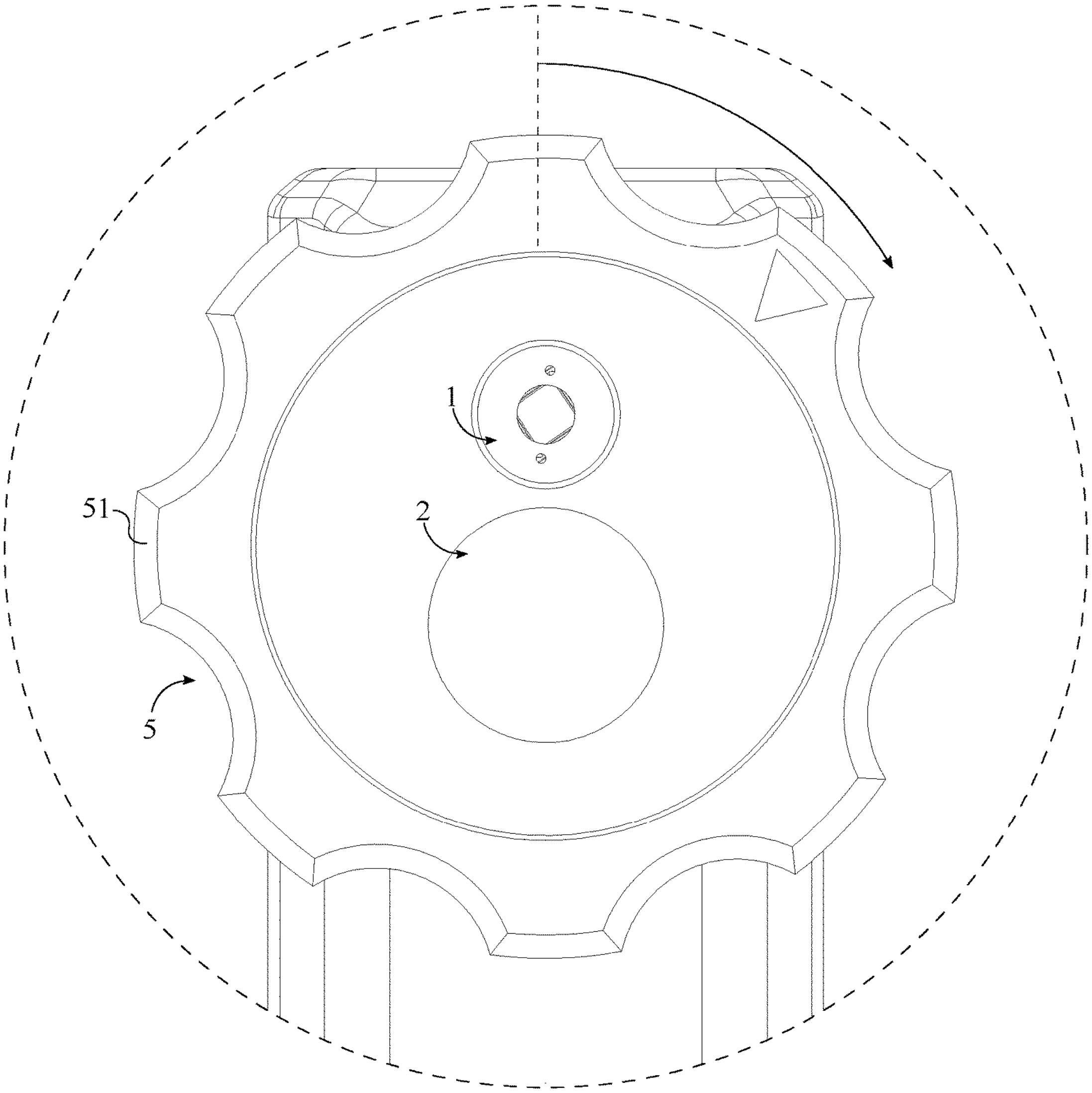
FIG. 5A is a detail view taken about circle 5 showing the bezel cogwheel turned to the first angular direction.
Figure 5B:
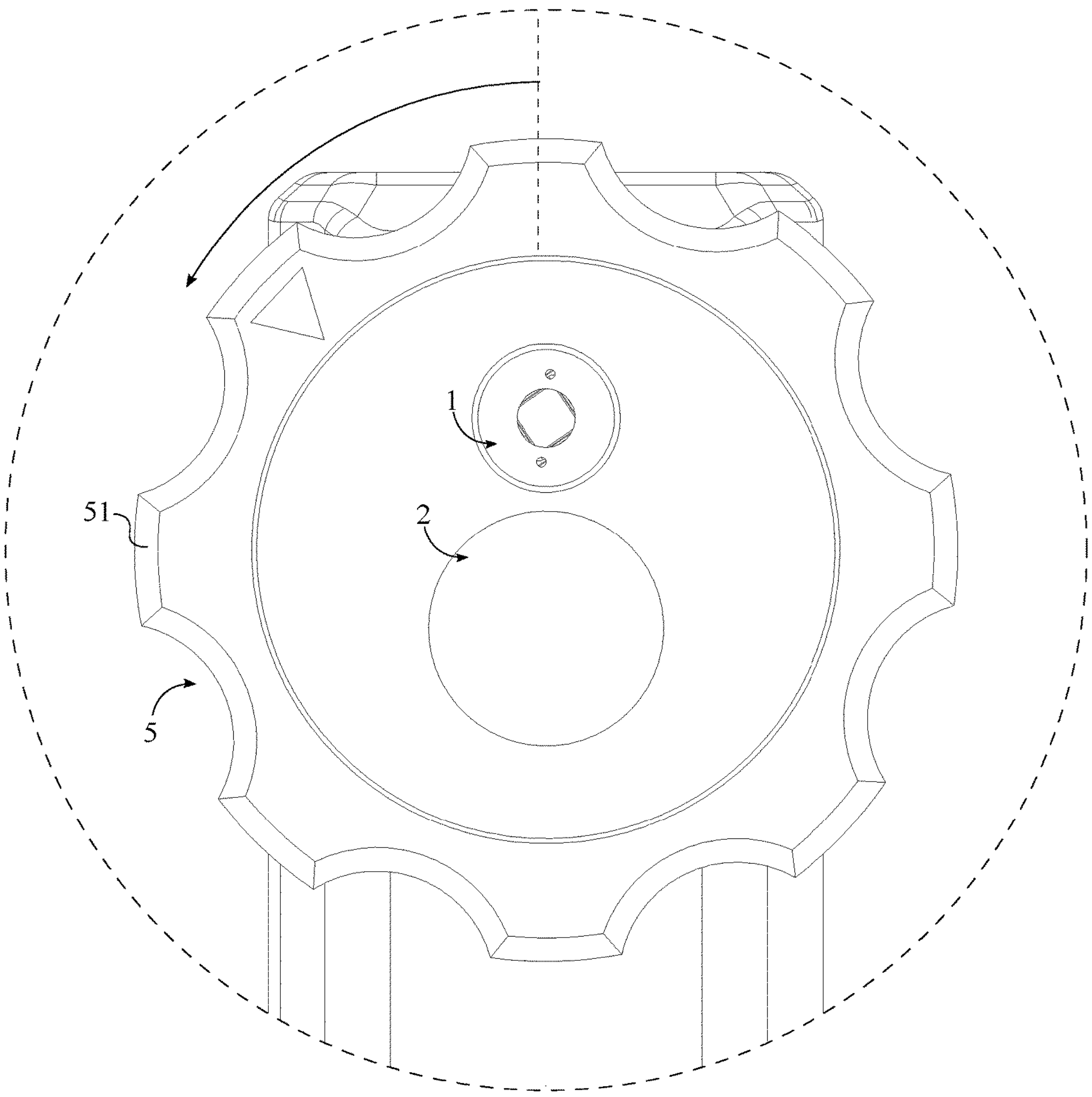
FIG. 5B is a detail view taken about circle 6 showing the bezel cogwheel turned to the second angular direction.

Referring now to FIG. 5A and FIG. 5B, in the preferred embodiment of the present invention, the bezel cogwheel 51 is operatively coupled to the rotary switch 52, wherein rotating the bezel cogwheel 51 in a first angular direction is used to complete an electrical circuit between the portable power source and the coherent-light emitter 1. Once the electrical circuit is completed, the coherent-light emitter 1 emits coherent light. Similarly, rotating the bezel cogwheel 51 in a second angular direction is used to complete an electrical circuit between the portable power source and the incoherent-light emitter 2. This causes the incoherent-light emitter 2 to emit incoherent light. The first angular direction and the second angular direction can be any angular direction as long as the first angular direction and the second angular direction are oriented opposite to each other. For example, rotating the bezel cogwheel 51 counter-clockwise may actuate the coherent-light emitter 1 whereas the rotating the bezel cogwheel 51 clockwise may actuate the incoherent-light emitter 2.

Figure 6:
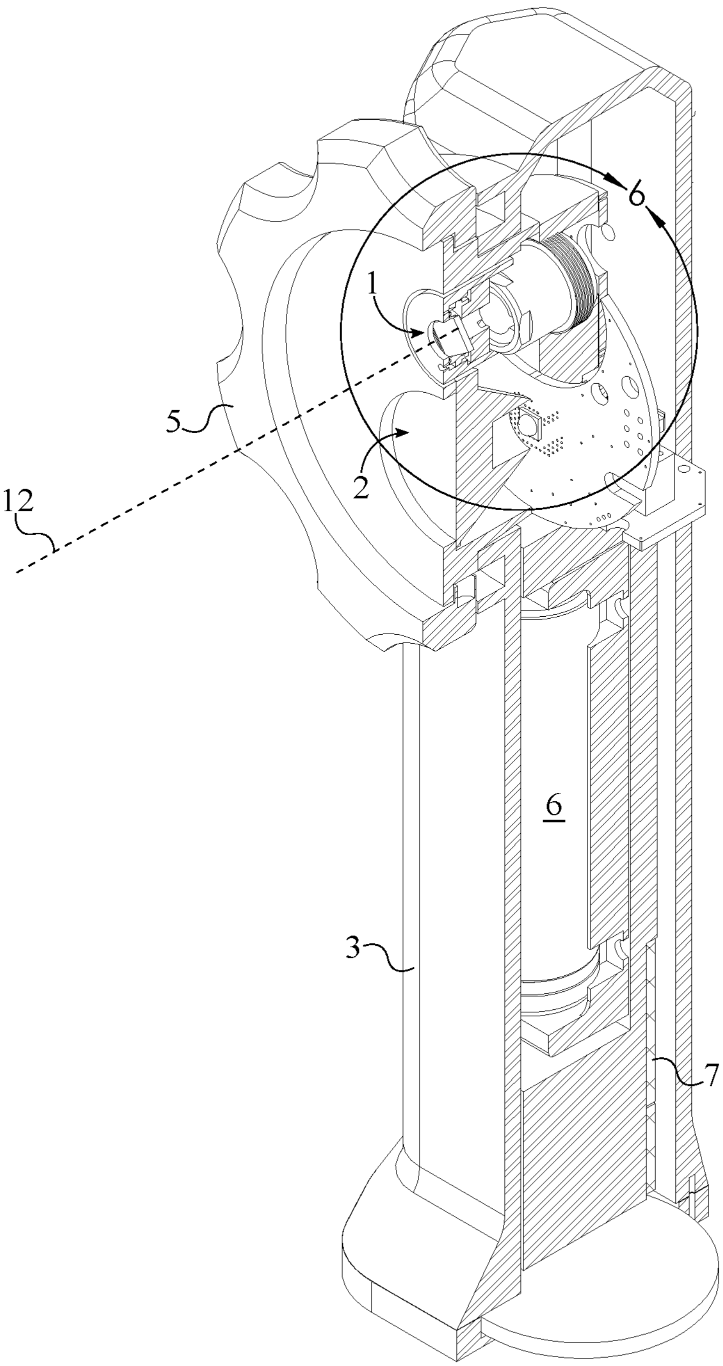
FIG. 6 is a cross-sectional view of the present invention, taken about line 3-3 in FIG. 5.
Figure 7:
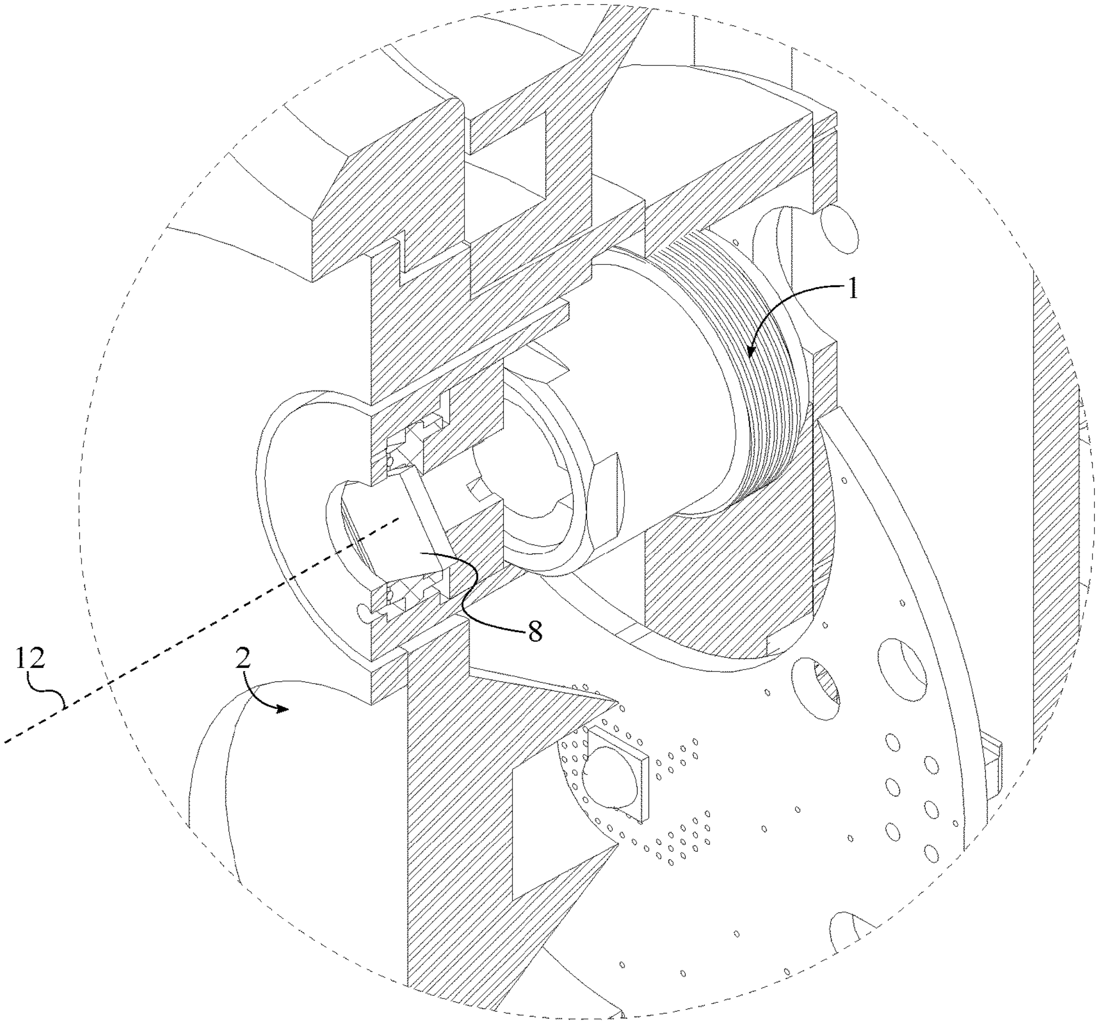
FIG. 7 is a detail view of the diffraction optical element taken about circle 6 in FIG. 3.

In the preferred embodiment, the coherent-light emitter 1 and the incoherent-light emitter 2 are encircled by the bezel cogwheel 51. The coherent-light emitter 1 create stripes of coherent light to delineate obstacles in a room filled with smoke and fire. FIG. 6 and FIG. 7 shows a diffraction optical element 8, void of lens or reflector, used to split the single coherent light beam emitted by the coherent-light emitter 1 into multiple light beams that can more clearly delineate obstacles. The diffraction optical element 8 is integrated into the elongated body 3 and positioned adjacent to the coherent-light emitter 1. An emission axis 12 of the coherent-light emitter 1 traverses through the diffraction optical element 8, thereby causing light emitted by the coherent-light emitter 1 to travel through the diffraction optical element 8. The diffraction optical element 8 is positioned adjacent to the coherent-light emitter 1. In the preferred embodiment, a beam of coherent light enters the diffraction optical element 8 and is split into multiple horizontally-propagating beams of coherent light that may be used to outline the obstacles present in a room filled with smoke and fire. Alternately, the diffraction optical element 8 may also produce a single horizontally-propagating light beam. The preferred embodiment of the present invention utilizes a coherent-light emitter 1 configured to generate coherent light within an approximate wavelength range of 450 nanometers (nm) to 560 nm. This corresponds to the green and blue colored light. Scotopic vision is stronger for blue to green light and therefore also more visible. In the preferred embodiment, the incoherent-light emitter 2 is a light emitting diode (LED), wherein the LED is configured to generate white light. The LED can be used as a secondary illumination source or to energize personal glow-in-the-dark equipment displays worn by firefighters. Firefighters usually wear photo-luminescent phosphor panels that become luminescent by the absorption of infrared radiation. The LED provides short bursts of light to charge the phosphor display and make it visible for short periods of time, while limiting light to avoid blinding the firefighter who is already adapted to the dark.

The preferred embodiment of the present invention can be placed in a jacket chest loop, or attached to a pocket or belt of a protective clothing. Once the present invention is secured onto the protective clothing, the coherent-light emitter 1 and the incoherent-light emitter 2 are positioned facing forward from the firefighter. In the preferred embodiment of the present invention, the rotatable-activation mechanism 5 is in easy reach the firefighter. This enables the firefighter to operate the coherent-light emitter 1 and the incoherent-light emitter 2 with one hand, with or without holding onto the elongated body 3, or with the elongated body 3 secured to the protective clothing. Moreover, the coherent-light emitter 1 and the incoherent-light emitter 2 are also laterally positioned on the elongated body 3. In particular, the coherent-light emitter 1 and the incoherent-light emitter 2 are mounted on the frontal surface of the elongated body 3. This configuration allows the firefighter to access the rotatable-activation mechanism 5 without blocking the light emitting out of the frontal area.

As can be seen in FIG. 3, in the preferred embodiment of the present invention, the rotatable-activation mechanism 5 is positioned above the elongated body 3. This gives the elongated body 3 a planar form factor that fits securely into the palm of the firefighter without blocking the light sources. The rotatable-activation mechanism 5 is positioned proximal to the fingers and thumbs. Further, the transversal cross section of the elongated body 3 is a hexagonal shape. The hexagonal shape of the elongated body 3 conforms to the natural contours of the human hand and helps the firefighter securely grip the present invention. The present invention is also provided with a cradle 10 capable of wirelessly recharging the portable power unit 6. The cradle 10 contains an inductive transmitter 11 capable of forming a magnetic coupling with the inductive receiver 7 inside the elongated body 3. As such, the inductive receiver 7 is terminally positioned on the elongated body 3, opposite to the coherent-light emitter 1 and the incoherent-light emitter 2, which positions the inductive transmitter 11 near the inductive receiver 7 when the elongated body 3 is inserted into the cradle 10. The preferred inductive transmitter 11 is integrated into the cradle 10. More specifically, the primary coil of the inductive transmitter 11 is integrated into the cradle 10. The primary coil inductively couples to the secondary coil of the inductive receiver 7, thereby enabling inductive magnetic communication between the inductive transmitter 11 and the inductive receiver 7. The inductive magnetic communication allows wireless transmission of power between the cradle 10 and the portable power unit 6, thereby recharging the portable power unit 6. The cradle 10 may be electrically connected to an external power supply such as an outlet or a wall. Alternately, the cradle 10 may possess a removable battery pack for providing power to the portable power unit 6. The preferred cradle 10 is dimensioned to fit behind a fire engine truck seat or in a door well. Alternate embodiments of the cradle 10 can be any shape or size.

Although the invention has been explained in relation to its preferred embodiment, it is to be understood that many other possible modifications and variations can be made without departing from the spirit and scope of the invention as hereinafter claimed.

What is claimed is:

1. An ergonomic torch apparatus comprising:
a coherent-light emitter;
an incoherent-light emitter;
an elongated body;
a rotatable-activation mechanism;
a portable power unit;
an inductive receiver;
a cradle;
an inductive transmitter;
the coherent-light emitter and the incoherent-light emitter being terminally integrated into the elongated body;
the rotatable-activation mechanism being externally mounted onto the elongated body;
the portable power unit being electrically connected to the coherent-light emitter and the incoherent-light emitter through the rotatable-activation mechanism;
the inductive receiver being integrated into the elongated body;
the portable power unit being mounted within the elongated body;
the inductive receiver being electrically connected to the portable power unit;
the rotatable-activation mechanism comprising a bezel cogwheel and a rotary inductive transmitter switch;
the bezel cogwheel being rotatably attached onto the rotary inductive transmitter switch;
the rotary inductive transmitter switch being integrated into the elongated body;
the portable power unit being electrically connected to the coherent-light emitter and the incoherent-light emitter through the rotary inductive transmitter switch;
the bezel cogwheel being operatively coupled to the rotary inductive transmitter switch;
an electrical circuit between the portable power source and the coherent-light emitter being completed in response to the bezel cogwheel being rotated in a first angular direction;

an electrical circuit between the portable power source and the incoherent-light emitter being completed in response to the bezel cogwheel being rotated in a second angular direction;

the first angular direction and the second angular direction being oriented opposite to each other;

the inductive receiver being terminally positioned on the elongated body, opposite to the coherent-light emitter and the incoherent-light emitter;

the inductive transmitter being integrated into the cradle;

the elongated body being positioned into cradle;

the inductive transmitter comprising a primary coil;

the inductive receiver comprising a secondary coil; and the inductive transmitter and the inductive receiver being inductive magnetic communication with each other by the primary coil and the secondary coil being inductively coupled to each other.

2. The ergonomic torch apparatus as claimed in claim 1 comprising:

the coherent-light emitter and the incoherent-light emitter being encircled by the bezel cogwheel.

3. The ergonomic torch apparatus as claimed in claim 1 comprising:

a diffraction optical element;

the diffraction optical element being integrated into the elongated body;

the diffraction optical element being positioned adjacent to the coherent-light emitter; and an emission axis of the coherent-light emitter traversing through the diffraction optical element.

4. The ergonomic torch apparatus as claimed in claim 1, wherein the coherent-light emitter is configured to generate coherent light within an approximate wavelength range of 450 nanometers (nm) to 650 nm.

5. The ergonomic torch apparatus as claimed in claim 1, wherein the incoherent light emitter is a light emitting diode (LED), and wherein the LED is configured to generate white light.

6. The ergonomic torch apparatus as claimed in claim 1, wherein a transversal cross section of the elongated body is a hexagonal shape.

7. An ergonomic torch apparatus comprising:

a coherent-light emitter;

an incoherent-light emitter;

an elongated body;

a deductive rotatable-activation mechanism;

a portable power unit;

an inductive receiver;

a cradle;

an inductive transmitter;

a diffraction optical element;

the coherent-light emitter and the incoherent-light emitter being terminally integrated into the elongated body;

the deductive rotatable-activation mechanism being externally mounted onto the elongated body;

the portable power unit being electrically connected to the coherent-light emitter and the incoherent-light emitter through the deductive rotatable-activation mechanism;

the inductive receiver being integrated into the elongated body;

the portable power unit being mounted within the elongated body;

the inductive receiver being electrically connected to the portable power unit;

the deductive rotatable-activation mechanism comprising a bezel cogwheel and a rotary deductive switch;

the bezel cogwheel being rotatably attached onto the rotary deductive switch;

the rotary deductive switch being integrated into the elongated body;

the portable power unit being electrically connected to the coherent-light emitter and the incoherent-light emitter through the rotary deductive switch;

the bezel cogwheel being operatively coupled to the rotary deductive switch;

an electrical circuit between the portable power source and the coherent-light emitter being completed in response to the bezel cogwheel being rotated in a first angular direction;

an electrical circuit between the portable power source and the incoherent-light emitter being completed in response to the bezel cogwheel being rotated in a second angular direction;

the first angular direction and the second angular direction being oriented opposite to each other;

the inductive receiver being terminally positioned on the elongated body, opposite to the coherent-light emitter and the incoherent-light emitter;

the inductive transmitter being integrated into the cradle;

the elongated body being positioned into cradle;

the inductive transmitter comprising a primary coil;

the inductive receiver comprising a secondary coil;

the inductive transmitter and the inductive receiver being inductive magnetic communication with each other by the primary coil and the secondary coil being inductively coupled to each other;

the diffraction optical element being integrated into the elongated body;

the diffraction optical element being positioned adjacent to the coherent-light emitter; and an emission axis of the coherent-light emitter traversing through the diffraction optical element.

8. The ergonomic torch apparatus as claimed in claim 7 comprising:

the coherent-light emitter and the incoherent-light emitter being encircled by the bezel cogwheel.

9. The ergonomic torch apparatus as claimed in claim 7, wherein the coherent-light emitter is configured to generate coherent light within an approximate wavelength range of 450 nanometers (nm) to 650 nm, wherein the incoherent light emitter is a light emitting diode (LED), wherein the LED is configured to generate white light, and wherein a transversal cross section of the elongated body is a hexagonal shape.

* * * * *

UNITED STATES PATENT AND TRADEMARK OFFICE

CERTIFICATE OF CORRECTION

PATENT NO. : 10,132,482 B1
APPLICATION NO. : 15/860149
DATED : November 20, 2018
INVENTOR(S) : Richard Redpath and James Redpath It is certified that error appears in the above-identified patent and that said Letters Patent is hereby corrected as shown below:

On the Title Page

Item (72) Inventors should read:
Redpath; Richard (Cary, NC), Redpath; James (Cary, NC), Redpath; Tawfiq (Cary, NC).

Signed and Sealed this
Twenty-fourth Day of November, 2020

Andrei Iancu
*Director of the United States Patent and Trademark Office*